United States Patent
Ray et al.

(10) Patent No.: US 7,746,449 B2
(45) Date of Patent: Jun. 29, 2010

(54) LIGHT DETECTION AND RANGING SYSTEM

(75) Inventors: Mark D. Ray, Burnsville, MN (US); James W. Swenson, Minneapolis, MN (US); Clinton T. Meneely, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 266 days.

(21) Appl. No.: 11/940,011

(22) Filed: Nov. 14, 2007

(65) Prior Publication Data

US 2009/0123158 A1 May 14, 2009

(51) Int. Cl.
*G01C 3/08* (2006.01)

(52) U.S. Cl. ................................ 356/5.01

(58) Field of Classification Search ........ 356/3.01–28.5
See application file for complete search history.

(56) References Cited

U.S. PATENT DOCUMENTS

| | | | |
|---|---|---|---|
| 3,523,730 A | 8/1970 | Hayek et al. | |
| 4,311,385 A | 1/1982 | Keene | |
| 4,326,799 A | 4/1982 | Keene et al. | |
| 5,337,189 A * | 8/1994 | Krawczyk et al. | 359/850 |
| 5,455,669 A * | 10/1995 | Wetteborn | 356/5.01 |
| 5,485,009 A | 1/1996 | Meyzonnetie et al. | |
| 5,808,727 A | 9/1998 | Katayama | |
| 6,504,602 B1 * | 1/2003 | Hinderling | 356/5.1 |
| 6,593,582 B2 | 7/2003 | Lee et al. | |

2007/0076201 A1  4/2007  Babin et al.

FOREIGN PATENT DOCUMENTS

| | | |
|---|---|---|
| DE | 69114461 T2 | 3/1996 |
| EP | 0173617 A | 3/1986 |
| EP | 0493247 A1 | 7/1992 |

OTHER PUBLICATIONS

J. Harms, W. Lahmann, and C. Weitkamp, Geometrical compression of lidar return signals, Applied Optics, vol. 17, No. 7, Optical Society of America, Apr. 1, 1978.

(Continued)

*Primary Examiner*—Thomas H Tarcza
*Assistant Examiner*—Luke D Ratcliffe
(74) *Attorney, Agent, or Firm*—Kevin O'Brien; Calfee, Halter & Griswold LLP

(57) ABSTRACT

A light detection and ranging system includes a mirror unit rotating around a scan axis. The mirror unit includes a receiving portion and a transmitting portion offset by an angle about the scan axis relative to a surface plane of the receiving portion. Respective centroids of the receiving and transmitting portions are positioned at a common point on the scan axis while the receiving and transmitting portions rotate around the scan axis. A transmitter transmits a light pulse toward the mirror unit. The transmitting portion is positioned to reflect the light pulse toward a target. A receiver is positioned to reflect the light pulse reflected from the target toward the receiver. The angle offset compensates for a change between a cone of illumination of the transmitting portion and a field-of-view of the receiving portion resulting from the rotation of the mirror unit.

19 Claims, 5 Drawing Sheets

OTHER PUBLICATIONS

J. Harms, Lidar return signals for coaxial and noncoaxial systems with central obstruction, Applied Optics, vol. 18, No. 10, Optical Society of America, May 15, 1979.

Carlo Bellecci and Francesco De Donato, Effect of the differential geometric form factor on differential absorption lidar measurements with topographical targets, Applied Optics, vol. 38, No. 24, Optical Society of America, Aug. 20, 1999.

Kamil Stelmaszczyk, Marcella Dell'Aglio, Stanislaw Chudzynski, Tadeusz Stacewicz, and Ludger Woste, Analytical function for lidar geometrical compression form-factor calculations, Applied Optics, vol. 44, No. 7, Optical Society of America, Mar. 1, 2005.

Albert V. Jelalian, Laser Radar Systems by Artech House, pp. 33-41, 1992.

European Search Report for EP Patent Application No. 08253634.3, received Aug. 13, 2009.

European Search Opinion for EP Patent Application No. 08253634.3, received Aug. 13, 2009.

\* cited by examiner

LIGHT DETECTION AND RANGING SYSTEM

BACKGROUND

The present invention relates to a scanning optical ranging system. It finds particular application in conjunction with a light detection and ranging (LIDAR) system and will be described with particular reference thereto. It will be appreciated, however, that the invention is also amenable to other applications.

A light detection and ranging (LIDAR) system transmits a pulse of light (e.g., from a laser), which is reflected from a target. An optical receiver detects the reflected light, and the range to the target is computed from the delay time between the transmission of the light pulse and the detection of the reflected light. The receiver field-of-view and the transmitted light beam are usually matched and co-aligned to ensure maximum light collection efficiency. If the LIDAR contains a fast optical scanner (such as a rapidly moving mirror), it is possible for the field-of-view of the receiver to lose alignment with respect to the projected light beam. Such alignment loss is caused by a change in the pointing direction that occurs during the time required for the light pulse to travel to the target, reflect, and then travel back to the receiver. The extent of this misalignment is a "lag angle," which depends on the speed of the scanner and the range of the target. For a scanning LIDAR that is "diffraction-limited" (i.e., the light beam divergence is limited only by the wavelength and the diameter of the beam at the exit aperture of the LIDAR), the scanner angular speed $\omega_{1/2}$ (measured in radians/second) for which the lag angle is half of the transmitted light beam divergence is:

$$\omega_{1/2} = \theta = \frac{0.5 \cdot \lambda \cdot c}{2 \cdot D \cdot R},$$

where $\lambda$ is the wavelength of the transmitted light (in meters), c is the speed of light (~$3 \times 10^8$ meters/second), D is the transmitted light beam diameter at the exit aperture of the LIDAR (in meters), and R is the range to the target (in meters).

If the receiver field-of-view is initially aligned to a transmitted light cone of illumination, the received signal is reduced by the lag angle. The effect becomes worse at longer ranges and as the scanner speed increases.

If the LIDAR system is not diffraction-limited and the transmitted beam divergence is instead $\Delta$, then the formula above becomes:

$$\omega_{1/2} = \theta = \frac{0.5 \cdot \Delta \cdot c}{2 \cdot R}.$$

For example, if the divergence of the transmitted light beam is 2 milliradians (mrad) and the range of a target is 3 km, the angular speed at which the lag angle is half of the transmitter beam width is 50 radians/second, or 480 revolutions/minute (rpm). In this case if the receiver field-of-view is matched to the transmitted light beam divergence, the lag angle is still sufficiently small for the optical receiver to detect some reduced amount of scattered light from the target, but for scanner speeds greater than 960 rpm, the lag angle effect causes the receiver field-of-view to completely miss or obscure the signal from 3 km and beyond. The condition for this complete obscuration is:

$$\omega_{obscure} = \theta = \frac{\Delta \cdot c}{2 \cdot R}.$$

All LIDAR systems, whether they are scanning or staring, must often contend with another issue—large signal dynamic range. Signal dynamic range is the ratio of the maximum detectable light signal intensity (i.e., detector saturation) to the minimum detectable light signal intensity. The detected signal decreases rapidly with increasing target distance. Therefore, the received signals from targets at closer ranges may over-saturate the detector, while those from targets at longer ranges may be barely detectable. A design technique known as "geometric compression" can reduce the signal dynamic range by controlling the fixed overlap of the transmitter and receiver optical fields-of-view, the separation of the receiver and transmitter optics, and the shadowing of the receiver by the transmitter optics to attenuate the close-range signal. The time delay of the received light signal with respect to the transmitted light pulse does not enter into this compression calculation since these design parameters are static. Geometric compression can benefit both scanning and staring LIDAR systems.

The present invention provides a new and improved apparatus and method which addresses the above-referenced problems.

SUMMARY

In one embodiment, a light detection and ranging system includes a mirror unit rotating around a scan axis. The mirror unit includes a receiving portion and a transmitting portion offset by an angle about the scan axis relative to a surface plane of the receiving portion. Respective centroids of the receiving and transmitting portions are positioned at a common point on the scan axis while the receiving and transmitting portions rotate around the scan axis. A transmitter transmits a light pulse toward the mirror unit. The transmitting portion is positioned to reflect the light pulse toward a target. A receiver is positioned to reflect the light pulse reflected from the target toward the receiver. The angle offset compensates for a change between a cone of illumination of the transmitting portion and a field-of-view of the receiving portion resulting from the rotation of the mirror unit.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
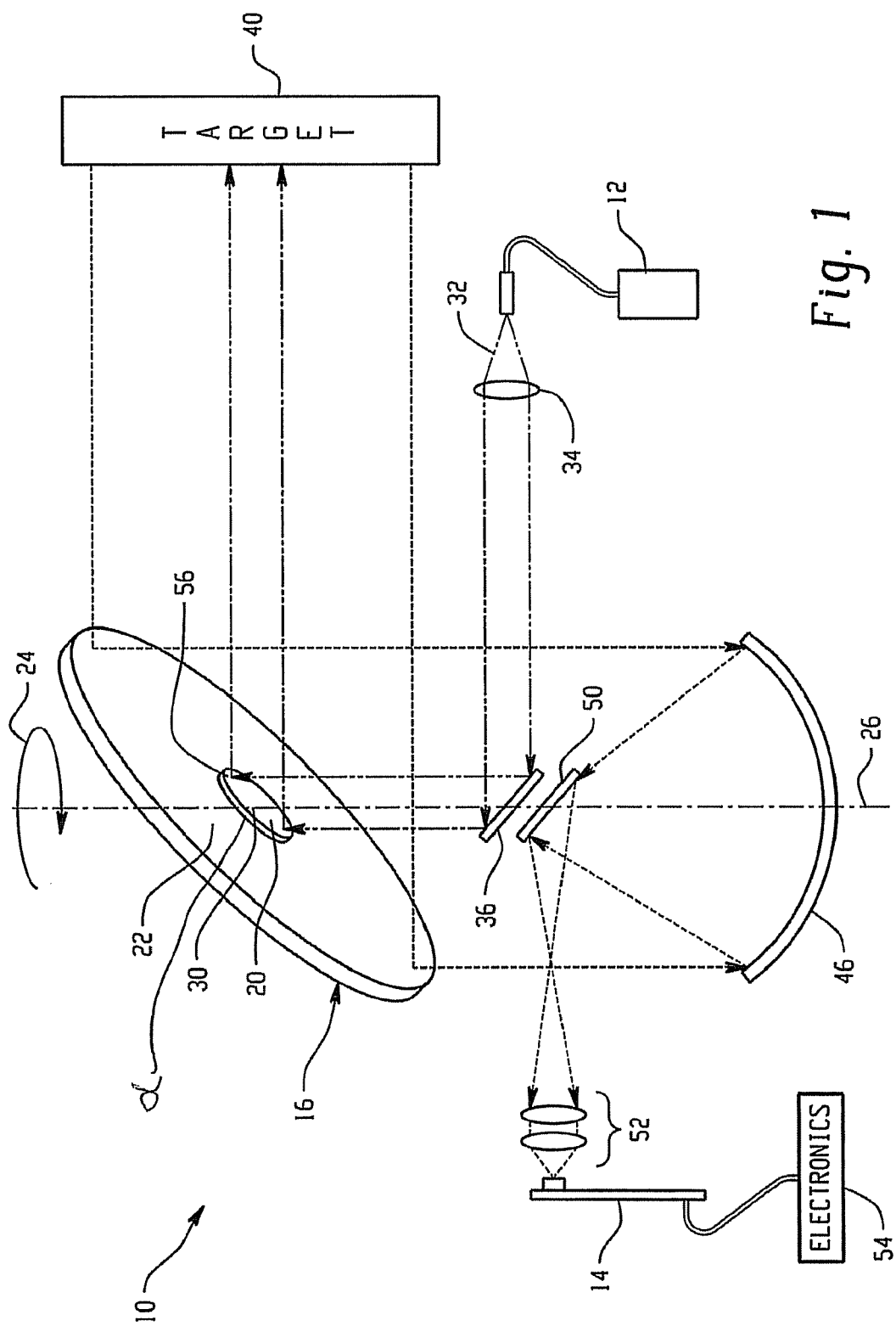
FIG. 1 illustrates a side view of a scanning system in accordance with one embodiment of an apparatus illustrating principles of the present invention.

With reference to FIG. 1, an optical scanning LIDAR system 10 includes a transmitter 12 and an optical receiver 14. A mirror unit 16 includes a transmitting portion 20 and a receiving portion 22. In one embodiment, both the transmitter 12 and optical receiver 14 rotate (scan) together at a constant rotation (speed) in one direction. More specifically, rotating elements, specifically the mirror unit 16, rotate (as illustrated by 24) at a predetermined speed about a scan axis 26. The transmitting and receiving portions 20, 22, respectively, are positioned concentrically to have a common centroid 30. The centroids 30 are positioned at a common point on the scan axis 26.

A light pulse 32 leaving the transmitter 12 passes through at least one lens 34 for collimating the light pulse 32. The light pulse 32 is then reflected off a first mirror 36 (e.g., a flat mirror) toward the transmitting portion 20 of the mirror unit 16, where the light pulse 32 is reflected toward a target 40. A transmitter cone of illumination 42 (see FIGS. 3 and 5) of the light pulse 32 transmitted from the transmitting portion 20 to the target 40 is defined by a divergence determining the spot size of the light pulse 32 on the target 40. The light pulse 32 reflects off the target 40 back toward the receiving portion 22 of the mirror unit 16. A receiver field-of-view 44 (see FIGS. 3 and 5) of the light pulse 32 reflected from the target 40 to the receiving portion 22 is defined by the full range of incidence angles that could detect a light pulse 32 on the receiving portion 22 and is normally matched in divergence to the transmitted cone of illumination. The reflected light pulse 32 is reflected off the receiving portion 22 of the mirror unit 16 toward a circular (e.g., spherical) mirror 46, which reflects the light pulse 32 toward a second mirror 50 (e.g., a flat mirror). The light pulse 32 is reflected off the second mirror 50, passes through at least one lens 52, and is detected by the optical receiver 14.

Electronics 54 communicating with the optical receiver 14 determine a range to the target 40 as a function of the time the light pulse is received at the optical receiver 14. In one embodiment, the range of the target 40 is determined measuring a delay time of the light received at the optical receiver 14 with respect to the transmission of the original light pulse.

The period of time between which the light pulse 32 leaves the transmitter 12 and is received at the optical receiver 14 is referred to as the delay time. The rotational motion of the rotating elements during the delay time displaces the receiver field-of-view 44 (see FIGS. 3 and 5) with respect to the transmitter cone of illumination 42 (see FIGS. 3 and 5). This displacement between the cone of illumination and receiver field-of-view 42, 44 results in a lag angle 56 (see FIG. 2) between the transmitter cone of illumination and receiver field-of-view 42, 44. The lag angle 56 increases as a function of the delay time and scan rate. Therefore, the lag angle 56 increases as a function of a distance between the transmitting portion 20 of the mirror unit 16, the target 40, and the optical receiver mirror portion 22. The distance between the mirror unit 16 (which includes mirrors 20 and 22) and the target 40 is referred to as the target range. If the transmitter cone of illumination 42 and receiver field-of-view 44 are co-aligned for targets at relatively closer ranges (as is typically the case with LIDAR systems), the lag angle increases with the target range.

Figure 2:
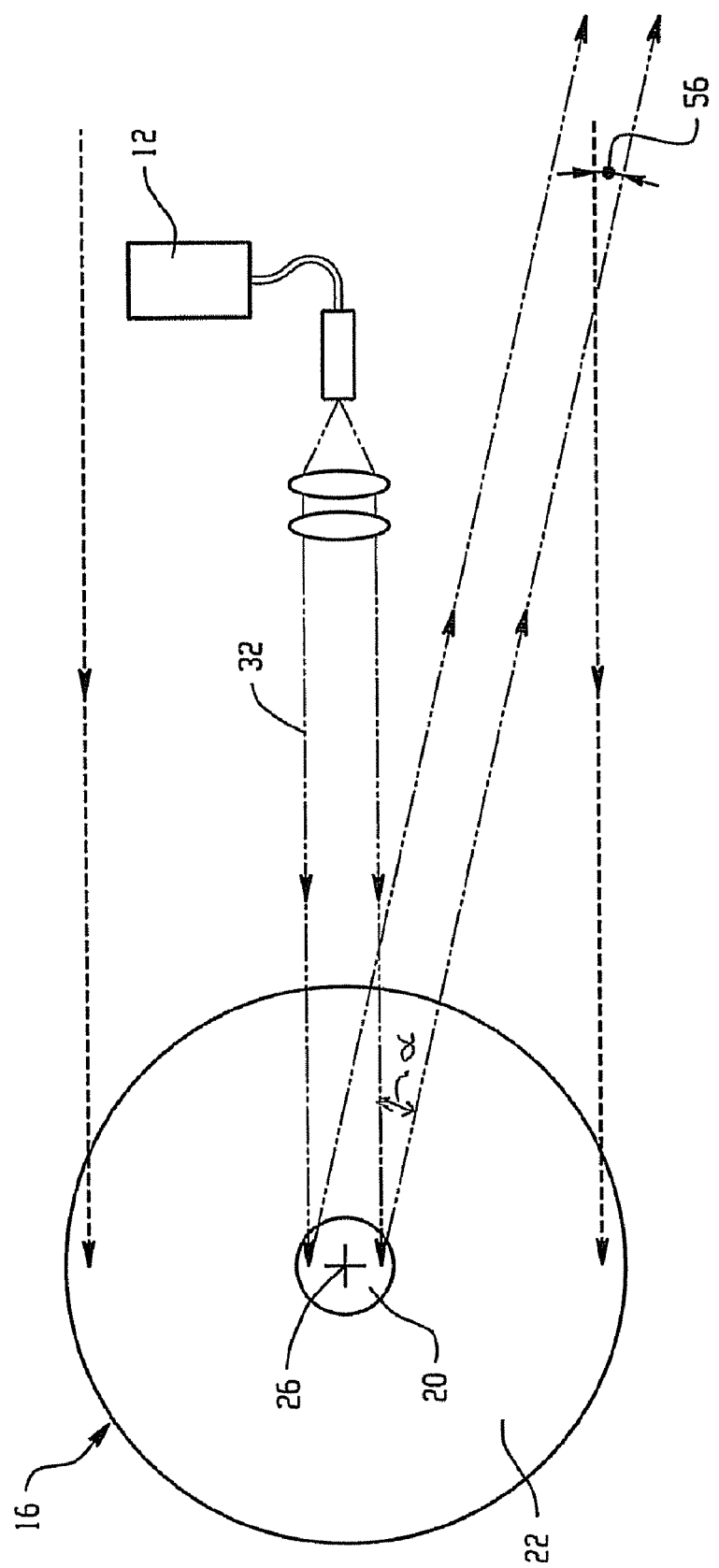
FIG. 2 illustrates a top view of the scanning system of FIG. 1.

As illustrated in FIG. 2, an angular offset (adjustment) $\alpha$ is made between the transmitting and receiving portions 20, 22 to compensate for this lag angle 56. Therefore, the angular adjustment is also referred to as lag angle compensation. More specifically, the transmitting portion 20 is rotated slightly about the axis 26 in the same direction 24 as the scan. Hence, the transmitter cone of illumination 42 always leads the receiver field-of-view 44, out to the maximum range. The angular adjustment is equal to the delay time of the maximum working target range multiplied by a rotational speed of the rotating elements. Therefore, for this adjustment, an overlap of the transmitter cone of illumination 42 and receiver field-of-view 44 and the receiver collection efficiency, is greatest at the maximum working target range.

Figures 3, 5:
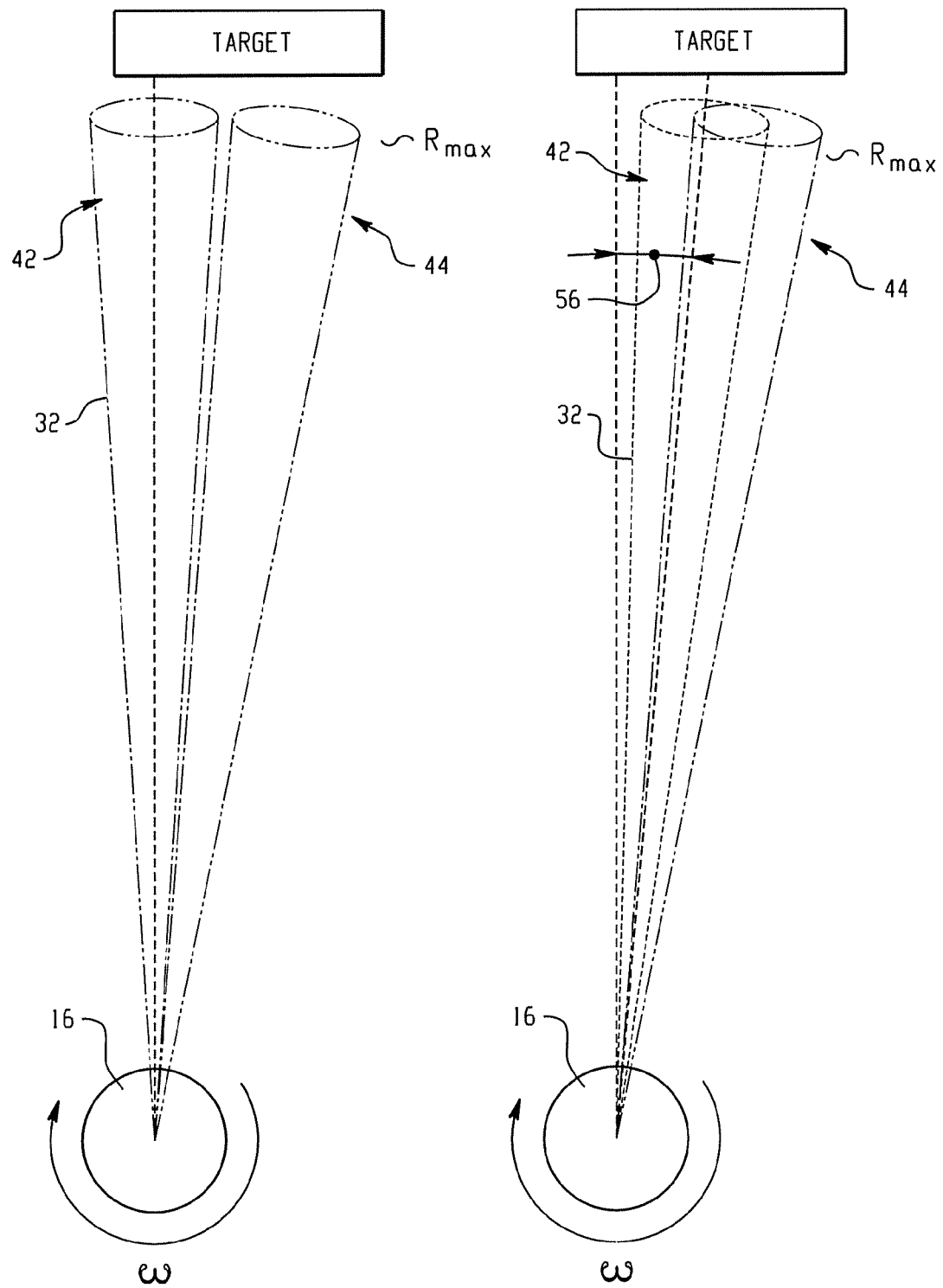
FIG. 3 illustrates a schematic representation of uncompensated transmitter and receiver fields-of-view.
FIG. 5 illustrates a schematic representation of a compensated transmitter cone of illumination and the receiver field-of-view, in accordance with one embodiment of an apparatus illustrating principles of the present invention.
Figure 4:
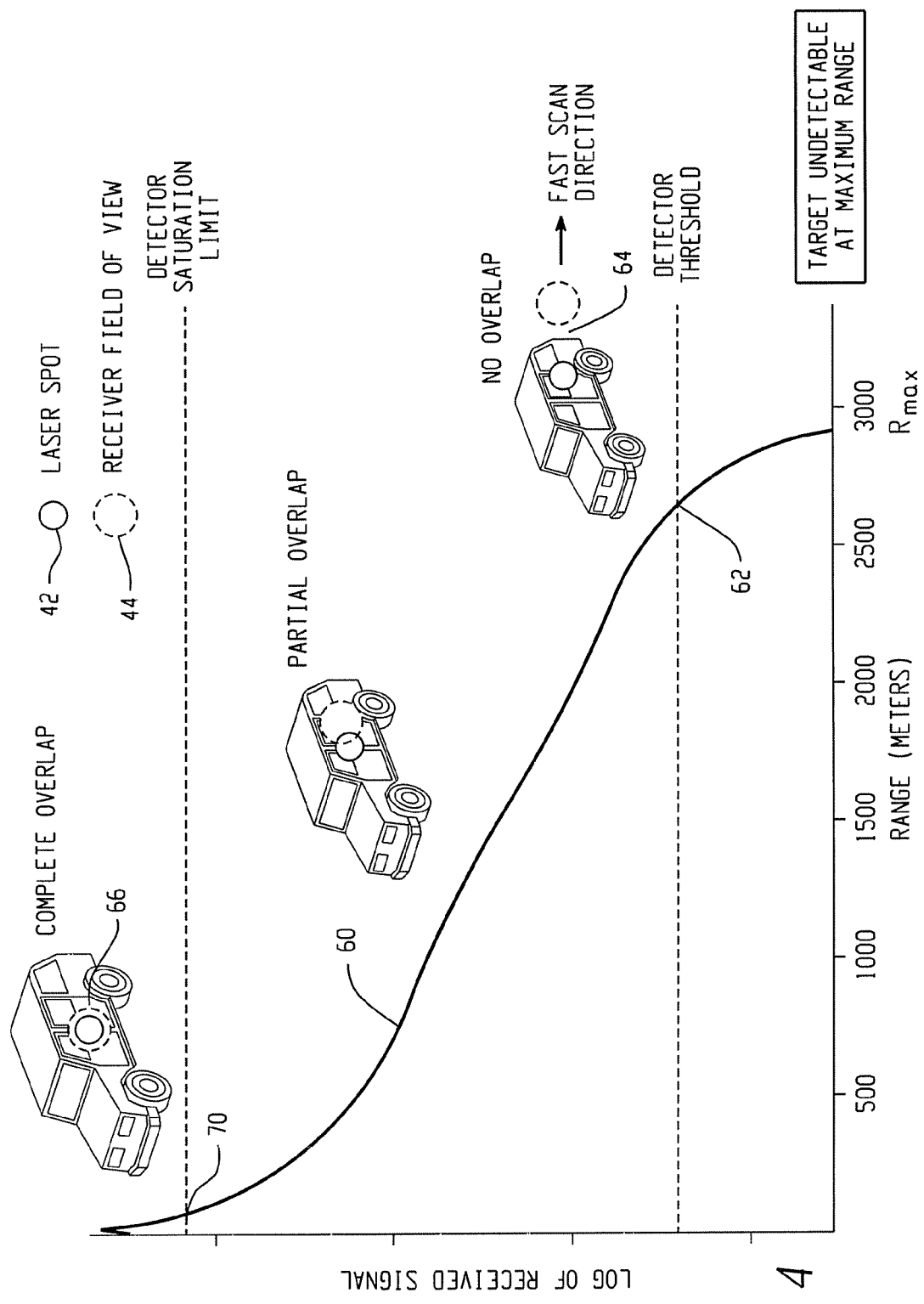
FIG. 4 illustrates a graph of a received signal vs. range for the uncompensated transmitter cone of illumination and the receiver field-of-view shown in FIG. 3.
Figure 6:
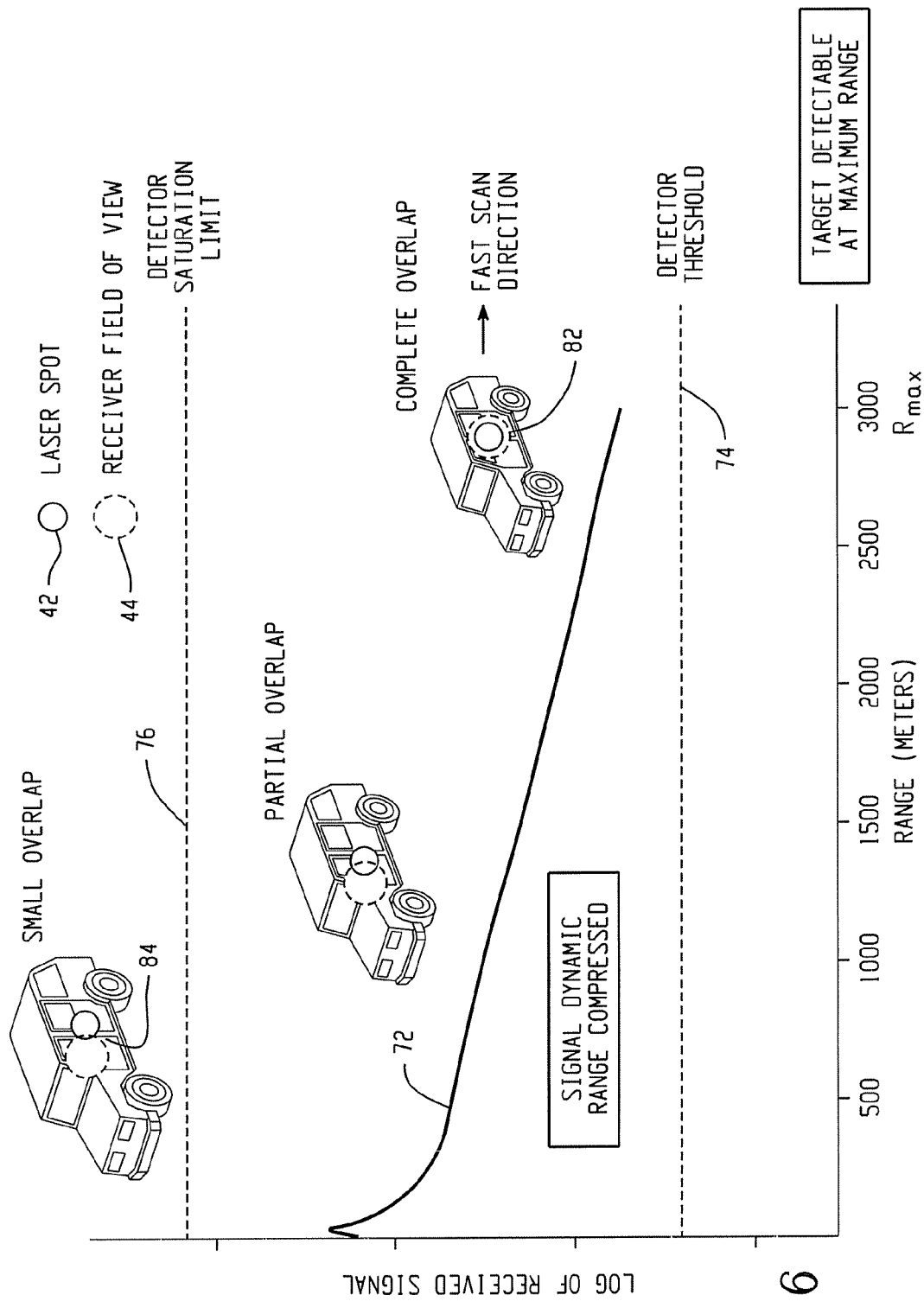
FIG. 6 illustrates a graph of a received signal vs. range for the compensated transmitter cone of illumination and the receiver field-of-view shown in FIG. 5.

FIG. 3 illustrates an overlap of the transmitter cone of illumination 42 and receiver field-of-view 44 in a system without the lag angle compensation. FIG. 4 illustrates a graph 60 of the logarithm of the intensity at the receiver vs. the target range for the configuration in FIG. 3. With reference to FIGS. 3 and 4, the intensity of light received at the optical receiver 14 (see FIG. 1) is determined as a function of the target range. For example, as the target range increases, for a constant target reflectivity, the light intensity received at the optical receiver 14 (see FIG. 1) decreases (e.g., decreases rapidly). Consequently, for a given target, the intensity of light at the optical receiver 14 (see FIG. 1) may vary significantly over the working range. The intensity of light detected at the optical receiver 14 (see FIG. 1) at the range 62 corresponds to the receiver threshold. Because of the delay time, a minimum overlap 64 occurs at the receiver threshold range 62, which contributes to the weak intensity at the optical receiver 14 (see FIG. 1). In addition, the graph 60 illustrates that a maximum overlap 66 occurs at a receiver saturation range 70 (closer to the optical receiver 14 (see FIG. 1)), which contributes to saturating the receiver 14 (see FIG. 1). A signal drop-off reduction at very short ranges occurs due to the transmit mirror obscuration of the receiver field-of-view 44, a form of geometrical compression. Although no signal reduction at short range is evident in FIG. 4 (graph 60), a signal reduction is illustrated in FIG. 6 (graph 72).

FIG. 5 illustrates an overlap of the transmitter cone of illumination 42 and receiver field-of-view 44 in a system with the lag angle compensation. FIG. 6 illustrates a graph 72 of the logarithm of the intensity at the receiver vs. the target range. With reference to FIGS. 5 and 6, the intensity of light received at the optical receiver 14 (see FIG. 1) is determined as a function of the target range. For example, as the target range increases, the light intensity received at the optical receiver 14 (see FIG. 1) decreases (except at very short ranges). However, unlike the embodiment illustrated in FIGS. 3 and 4, the graph 72 shows the intensity of light detected by the optical receiver 14 (see FIG. 1) is between the detector threshold 74 and detector saturation limit 76 over the entire working target range (e.g., about 2 m to about 3,000 meters). In addition, because of the lag angle compensation, the maximum overlap 82 between the transmitter cone of illumination 42 and receiver field-of-view 44 occurs at approximately the maximum target range (e.g., about 3,000 meters), while the minimum overlap 84 between the transmitter cone of illumination 42 and receiver field-of-view 44 occurs at approximately the minimum target range. The lag angle compensation increases the light signal detected by the optical receiver 14 (see FIG. 1) from a target located at the maximum working range, and reduces the signal received at close range, and thus the dynamic range of the detected light intensity is compressed over the entire working range.

The decreased dynamic range of the light signals at the optical receiver 14 (see FIG. 1) reduces demands on the receiver sensor and the associated electronics. High-speed electronics with high dynamic range are often expensive and difficult to fabricate.

In one embodiment, the lag angle compensation is made smaller than the transmitter cone of illumination and/or receiver field-of-view at all working ranges of the system. Similar results are obtained if the receiver field-of-view and the transmitter divergence are different and the compensation lag angle is the same as the maximum expected lag angle. The amount of lag relative to the receiver field of view and/or transmitter cone of illumination may be tailored to minimize the dynamic range of light intensity received by the receiver while maximizing the light intensity received at the receiver for long-range targets.

It is contemplated that the LIDAR system scans quickly (e.g., time of flight of the light pulse is not negligibly short relative to the associated scan movement in percent of spot size) and also unidirectionally, where the lag angle is always in the same direction and the magnitude of the lag angle is linearly related to the range. For a slowly scanned system (e.g., the time-of-flight of the light pulse is negligibly short relative to the associated scan movement in percent of spot size), signal compression by optimization of lag angle compensation (SCOLAC) is unnecessary and cannot significantly compress the intensity range of received light. For fast scanning systems where the scan direction reverses or moves in different directions (e.g., a Palmer mirror scan), SCOLAC might still be used, but may be more difficult to implement if, for example, the reversing motion is not constant in velocity (e.g., as in a sinusoidal scan).

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A light detection and ranging system, comprising:
    a mirror unit rotating around a scan axis, the mirror unit including:
        a receiving portion; and
        a transmitting portion offset by an angle about the scan axis relative to a surface plane of the receiving portion, respective centroids of the receiving and transmitting portions being positioned at a common point on the scan axis while the receiving and transmitting portions rotate around the scan axis;
    a transmitter transmitting a light pulse toward the mirror unit, the transmitting portion being positioned to reflect the light pulse toward a target; and
    an optical receiver, the receiving portion being positioned to reflect the light pulse reflected from the target toward the receiver, the angle offset compensating for a change between a cone of illumination of the transmitting portion and a field-of-view of the receiving portion resulting from the rotation of the mirror unit.

2. The light detection and ranging system as set forth in claim 1, wherein the light pulse reflected by the receiving portion is received by the receiver, the system further including:
    electronics, communicating with the optical receiver, for determining a range of the target as a function of a time delay of the light pulse received at the optical receiver.

3. The light detection and ranging system as set forth in claim 2, wherein:
    the range of the target is determined as a function of the time delay of the light pulse detected at the optical receiver.

4. The light detection and ranging system as set forth in claim 3, wherein:
    the intensity of the light pulse is detectable at the optical receiver when the range of the target is about 3 km.

5. The light detection and ranging system as set forth in claim 1, wherein the receiving portion field-of-view overlaps the transmitting cone of illumination as a function of a range of the target.

6. The light detection and ranging system as set forth in claim 5, wherein the receiving portion field-of-view and the transmitting cone of illumination substantially completely overlap at a maximum range of the target detectable by the optical receiver.

7. The light detection and ranging system as set forth in claim 6, wherein the receiving portion field-of-view overlaps about ½ of the transmitting cone of illumination at about ½ of the maximum range of the target detectable by the optical receiver.

8. The light detection and ranging system as set forth in claim 6, wherein the receiving portion field-of-view overlaps less than ½ of the transmitting cone of illumination at less than about ½ of the maximum range of the target detectable by the optical receiver.

9. The light detection and ranging system as set forth in claim 1, wherein the receiving and transmitting portions are concentric.

10. A light detection and ranging mirror, comprising:
    a receiving portion; and
    a transmitting portion offset by an angle about a scan axis relative to a surface plane of the receiving portion, respective centroids of the receiving and transmitting portions being positioned at a common point on the scan axis, the receiving and transmitting portions rotating around the scan axis, the transmitting portion being positioned to reflect a light pulse onto a target as a transmitted spot, the receiving portion being positioned to direct the light pulse reflected from the target onto the receiving portion as a receiving portion field-of-view, the receiving portion field-of-view overlapping the transmitted spot as a function of a range of the target and the angular offset transmitting portion relative to the receiving portion.

11. The light detection and ranging mirror as set forth in claim 10, wherein the receiving portion field-of-view increasingly overlaps the transmitted spot as the range of the target increases.

12. The light detection and ranging mirror as set forth in claim 11, wherein the receiving portion field-of-view substantially overlaps the transmitted spot at a maximum range of the target.

13. The light detection and ranging mirror as set forth in claim 12, wherein the receiving portion field-of-view overlaps about ½ of the transmitted spot at about ½ of the maximum range of the target.

14. The light detection and ranging mirror as set forth in claim 10, wherein the receiving portion is around the transmitting portion.

15. The light detection and ranging mirror as set forth in claim 10, wherein an intensity of the light pulse reflected from the target onto the receiving portion is a function of the overlap between the receiving portion field-of-view and the transmitted spot.

16. A method for determining a range to a target, the method comprising:
   rotating a mirror unit around a scan axis;
   reflecting a light pulse off of a transmitting portion of the mirror unit toward a target;
   reflecting a light pulse, received from the target, off of a receiving portion of the mirror unit toward a receiver; and
   compensating for a lag angle, caused by the rotation of the mirror unit around the axis, between the time the light pulse is reflected from the transmitting portion and the time the received light pulse is reflected from the receiving portion as a function of a maximum working target range and an angular offset transmitting portion relative to the receiving portion.

17. The method for determining a range to a target as set forth in claim 16, wherein the compensating includes:
   angularly offsetting the transmitting portion about the scan axis from a surface plane of the receiving portion.

18. The method for determining a range to a target as set forth in claim 17, wherein the compensating further includes:
   creating a maximum overlap between a transmitting portion cone of illumination, associated with the transmitting portion, and a receiving portion field-of-view, associated with the receiving portion, at a maximum range of the target.

19. The method for determining a range to a target as set forth in claim 18, wherein the compensating further includes:
   creating a minimum overlap between the transmitting portion cone of illumination and the receiving portion field-of-view at a minimum range of the target.

\* \* \* \* \*